US012429923B2

(12) United States Patent
Hosokai (10) Patent No.: US 12,429,923 B2
(45) Date of Patent: Sep. 30, 2025

(54) STAND AND KEYBOARD-STAND SET

(71) Applicant: LENOVO (SINGAPORE) PTE. LTD., Singapore (SG)

(72) Inventor: Tatsuya Hosokai, Yokohama (JP)

(73) Assignee: LENOVO (SINGAPORE) PTE. LTD., Singapore (SG)

(*) Notice: Subject to any disclaimer, the term of this patent is extended or adjusted under 35 U.S.C. 154(b) by 197 days.

(21) Appl. No.: 18/543,445

(22) Filed: Dec. 18, 2023

(65) Prior Publication Data
US 2024/0264637 A1 Aug. 8, 2024

(30) Foreign Application Priority Data
Feb. 2, 2023 (JP) ................................. 2023-014458

(51) Int. Cl.
*G06F 1/16* (2006.01)
*G06F 3/02* (2006.01)

(52) U.S. Cl.
CPC .......... *G06F 1/1669* (2013.01); *G06F 1/1607* (2013.01); *G06F 1/1626* (2013.01); *G06F 1/1681* (2013.01); *G06F 3/0208* (2013.01); *G06F 3/0227* (2013.01)

(58) Field of Classification Search
CPC combination set(s) only.
See application file for complete search history.

(56) References Cited

U.S. PATENT DOCUMENTS

| 8,369,074 | B2* | 2/2013 | Chou | G06F 1/1632 |
| | | | | 345/169 |
| 8,794,436 | B2* | 8/2014 | Hsu | F16M 11/10 |
| | | | | 206/320 |
| 8,851,280 | B2* | 10/2014 | Wen | A45C 11/00 |
| | | | | 206/320 |
| 8,891,239 | B2* | 11/2014 | Yu | H05K 5/0217 |
| | | | | 455/575.4 |
| 9,179,567 | B2* | 11/2015 | Hung | G06F 1/166 |
| 9,329,639 | B2* | 5/2016 | Lee | G06F 1/166 |
| 9,483,076 | B2* | 11/2016 | Liang | G06F 1/1626 |
| 9,795,213 | B1* | 10/2017 | Vier | G06F 1/1626 |
| 9,990,007 | B2* | 6/2018 | Nakagaki | G06F 1/166 |
| 10,063,268 | B2* | 8/2018 | Gygax | G06F 1/1626 |
| 10,372,169 | B1* | 8/2019 | Ferren | G06F 1/1628 |

(Continued)

FOREIGN PATENT DOCUMENTS

JP 2018105961 A 7/2018

*Primary Examiner* — Lisa Lea-Edmonds
(74) *Attorney, Agent, or Firm* — SHIMOKAJI IP (57) ABSTRACT

A stand includes: a frame body has an opening portion and a supporting portion is around the opening portion and supports a rear surface of the electronic apparatus; a leg portion is rotatably connected to the supporting portion inside the opening portion via a torque hinge and is capable of moving between a first angular position, at which the leg portion is accommodated at least inside the opening portion, and a second angular position, at which the leg portion protrudes from the supporting portion by rotating in a first direction from the first angular position; a first magnet that is provided on an inside surface of the supporting portion to face the opening portion; and a second magnet that is provided on an outside surface of the leg portion to face the inside surface of the supporting portion and that is capable of being attracted to the first magnet.

7 Claims, 7 Drawing Sheets

(56) References Cited

U.S. PATENT DOCUMENTS

| | | | |
|---|---|---|---|
| 10,558,244 B1* | 2/2020 | Brocklesby | G06F 1/1616 |
| 10,606,319 B1* | 3/2020 | Brocklesby | G06F 1/1681 |
| 10,635,132 B1* | 4/2020 | Brocklesby | G06F 1/1681 |
| 10,664,012 B1* | 5/2020 | Zimmerman | A45C 11/00 |
| 10,754,392 B2 | 8/2020 | Wendt | G06F 1/1679 |
| 10,860,068 B2* | 12/2020 | Brocklesby | G06F 1/166 |
| 11,054,864 B1* | 7/2021 | Watamura | G06F 1/1626 |
| 11,137,797 B2* | 10/2021 | Claudepierre | H04M 1/0254 |
| 11,307,615 B2* | 4/2022 | Zimmerman | G06F 1/166 |
| 11,561,575 B2* | 1/2023 | Perelli | G06F 1/1647 |
| 11,853,122 B2* | 12/2023 | Zimmerman | G06F 3/03545 |
| 11,880,234 B2* | 1/2024 | Hsu | G06F 1/1669 |
| 12,038,791 B2* | 7/2024 | Yao | G06F 1/1618 |
| 12,055,979 B2* | 8/2024 | Hosokai | G06F 1/1626 |
| 12,265,429 B2* | 4/2025 | Perelli | G06F 1/1641 |
| 2012/0170194 A1* | 7/2012 | Lord | F16M 13/00 248/371 |
| 2013/0020215 A1* | 1/2013 | Hsu | F16M 11/10 206/320 |
| 2014/0029189 A1* | 1/2014 | Chang | G06F 1/1615 361/679.11 |
| 2015/0043155 A1* | 2/2015 | Liang | G06F 1/1632 361/679.43 |
| 2015/0055284 A1* | 2/2015 | Han | F16M 11/38 361/679.12 |
| 2020/0249726 A1* | 8/2020 | Brocklesby | H02G 11/003 |
| 2020/0285279 A1* | 9/2020 | Zimmerman | F16M 11/10 |
| 2021/0333839 A1* | 10/2021 | Yao | G06F 1/1681 |
| 2022/0206527 A1* | 6/2022 | Perelli | G06F 1/1626 |
| 2022/0236765 A1* | 7/2022 | Zimmerman | H04M 1/04 |
| 2022/0334611 A1* | 10/2022 | Hsu | G06F 1/1656 |
| 2023/0195176 A1* | 6/2023 | Perelli | G06F 1/1618 361/679.01 |
| 2023/0259175 A1* | 8/2023 | Hosokai | G06F 1/1626 361/679.17 |
| 2024/0263733 A1* | 8/2024 | Hosokai | B29C 65/486 |
| 2024/0264637 A1* | 8/2024 | Hosokai | G06F 3/0227 |
| 2025/0004507 A1* | 1/2025 | Yao | G06F 1/1681 |

* cited by examiner

STAND AND KEYBOARD-STAND SET

BACKGROUND OF THE INVENTION

Field of the Invention

The present invention relates to a stand and a keyboard-stand set that support an electronic apparatus in an erect state.

Description of the Related Art

In recent years, thin electronic apparatuses such as laptop PCs and tablet PCs, each of which has a touch panel type display and does not have a physical keyboard, have become widespread. Regarding the type of the electronic apparatuses, it is easy to carry the electronic apparatus since the input work may be performed through the touch panel. As a result, it is easy to operate the electronic apparatus. However, it is difficult for such an electronic apparatus to be used independently like a general clamshell type laptop PC. Therefore, the present applicant has proposed a kickstand-type stand that supports an electronic apparatus in an erect state in Japanese Unexamined Patent Application Publication No. 2018-105961.

SUMMARY OF THE INVENTION

It is desirable that the above-described stand can be kept in a state where the leg portion is accommodated by being folded in a case where the leg portion serving as the kickstand is not used. However, for example, in a case where a physical stopper member or the like for keeping the leg portion in the accommodated state is provided, there is a concern that the reduction in thickness of the entire stand is impaired.

The present invention has been made in view of the above problems, and an object of the present invention is to provide a stand and a keyboard-stand set capable of keeping a leg portion in an accommodated state while maintaining reduction in thickness.

According to a first aspect of the present invention, there is provided a stand that supports an electronic apparatus in an erect state. The stand includes: a frame body that has an opening portion and a supporting portion which is provided around the opening portion and which supports a rear surface of the electronic apparatus; a leg portion that is rotatably connected to the supporting portion inside the opening portion via a torque hinge and that is capable of moving between a first angular position, at which the leg portion is accommodated at least inside the opening portion, and a second angular position, at which the leg portion protrudes from the supporting portion by rotating in a first direction from the first angular position; a first magnet that is provided on an inside surface of the supporting portion to face the opening portion; and a second magnet that is provided on an outside surface of the leg portion to face the inside surface of the supporting portion and that is capable of being attracted to the first magnet.

According to a second aspect of the present invention, there is provided a keyboard-stand set including: a keyboard that is for wirelessly inputting to an electronic apparatus; and a stand that supports the electronic apparatus in an erect state. The stand includes a frame body that has an opening portion and a supporting portion which is provided around the opening portion and which supports a rear surface of the electronic apparatus, a leg portion that is rotatably connected to the supporting portion inside the opening portion via a torque hinge and that is capable of moving between a first angular position, at which the leg portion is accommodated at least inside the opening portion, and a second angular position, at which the leg portion protrudes from the supporting portion by rotating in a first direction from the first angular position, a first magnet that is provided on an inside surface of the supporting portion to face the opening portion, a second magnet that is provided on an outside surface of the leg portion to face the inside surface of the supporting portion and that is capable of being attracted to the first magnet, and a band portion that is provided along one edge of the supporting portion, has a width capable of supporting a side surface of the electronic apparatus, and rotatably connects the stand and one edge of the keyboard.

According to the above-described aspects of the present invention, the leg portion can be kept in the accommodated state while maintaining reduction in thickness.

DETAILED DESCRIPTION OF THE INVENTION

Hereinafter, a stand and a keyboard-stand set according to embodiments of the present invention will be described in detail with reference to suitable embodiments and the accompanying drawings.

Figure 1:
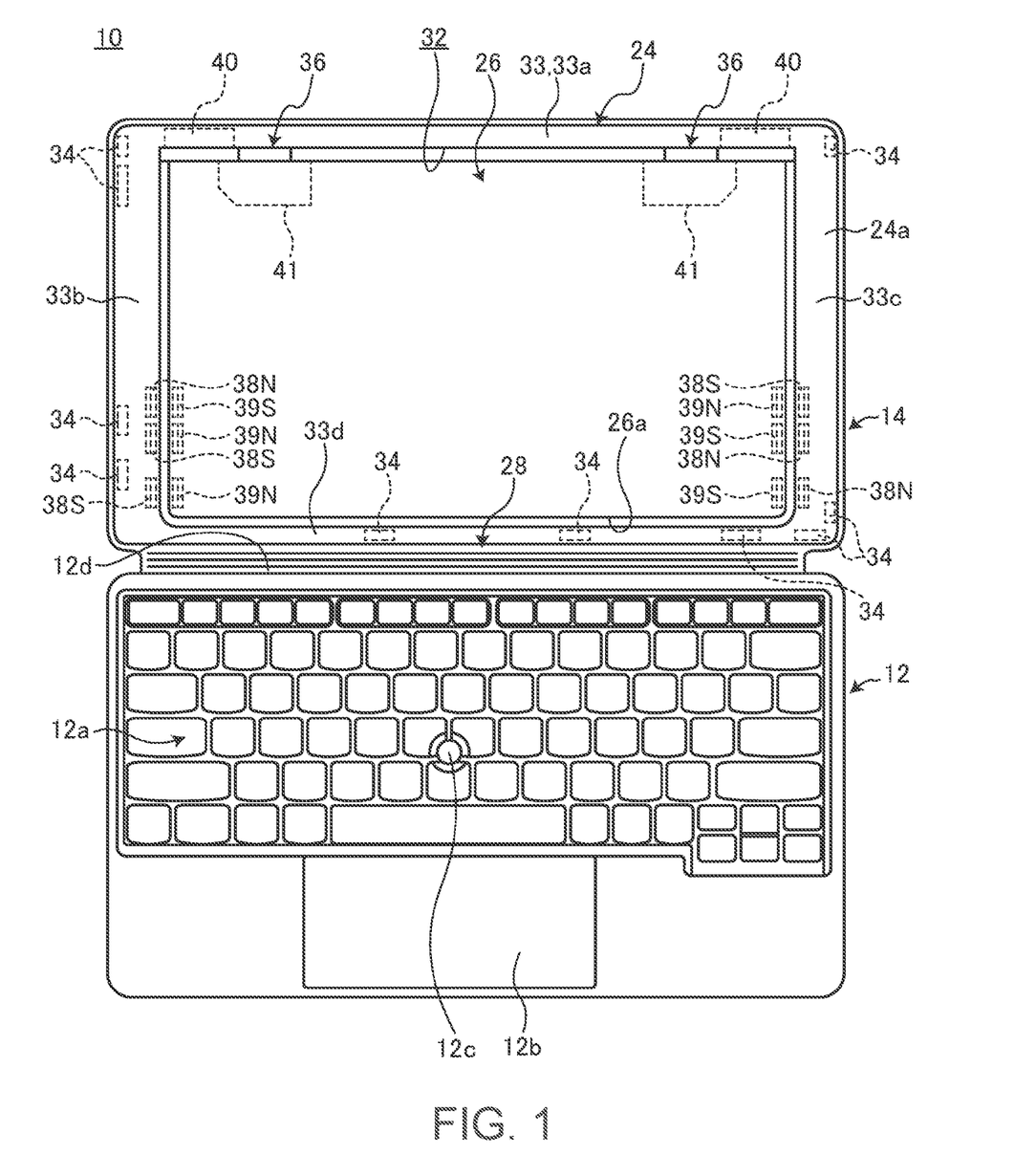
FIG. 1 is a plan view of a keyboard-stand set according to an embodiment.
Figure 2:
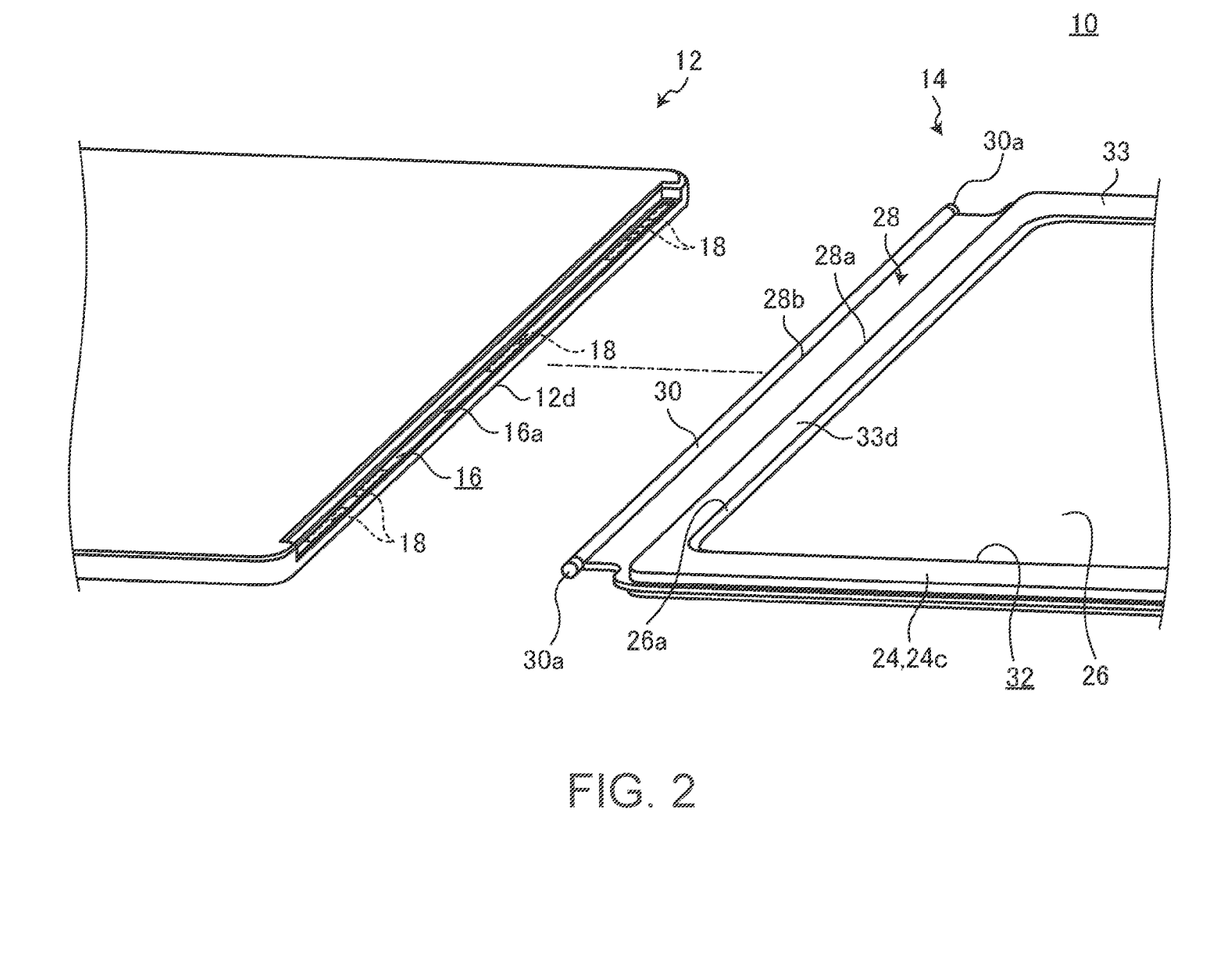
FIG. 2 is an exploded perspective view of a keyboard and a stand as viewed from a rear side.

FIG. 1 is a plan view of a keyboard-stand set 10 according to the embodiment. FIG. 2 is an exploded perspective view of a keyboard 12 and a stand 14 as viewed from a rear side. As illustrated in FIGS. 1 and 2, the keyboard-stand set 10 according to the present embodiment includes the keyboard 12 and the stand 14.

First, the keyboard 12 will be described.

The keyboard 12 is a device that is for wirelessly inputting to the electronic apparatus. As the electronic apparatus, a portable computer that does not have a physical keyboard is mostly considered. Examples thereof include thin electronic apparatuses such as a foldable PC, a tablet PC, and a smartphone. Wireless communication performed between the keyboard 12 and the electronic apparatus includes, for example, Bluetooth (registered trademark).

The keyboard 12 has a flat box shape having a general size. A plurality of keys 12a, a touch pad 12b, and a pointing stick 12c, which are aligned, are provided on the upper surface of the keyboard 12. The keyboard 12 illustrated in FIG. 1 is a compact type that does not have a numeric keypad, but may be a full-size type that has a numeric keypad, an independently disposed cursor key, or the like. The keyboard 12 has a battery. In the keyboard 12, one or both of the touch pad 12b and the pointing stick 12c may be removed.

In the keyboard 12, a recessed portion 16 is formed on a rear side edge portion 12d. The recessed portion 16 extends along the edge portion 12d and is open toward the lower surface side. The recessed portion 16 has a height and a length by which the bar 30 to be described later can be inserted and fit into the recessed portion 16. A plurality of magnets 18 are provided on an upper surface 16a of the recessed portion 16. In the case of the present embodiment, two magnets 18 are provided in the vicinity of each of both ends of the upper surface 16a and one magnet 18 is provided in the central portion. Consequently, a total of five magnets 18 is provided (refer to FIG. 2). The number, positions, and sizes of the magnets 18 are not limited thereto. The magnet 18 is covered with a thin cover which forms the upper surface 16a.

Next, the stand 14 will be described.

Figure 3:
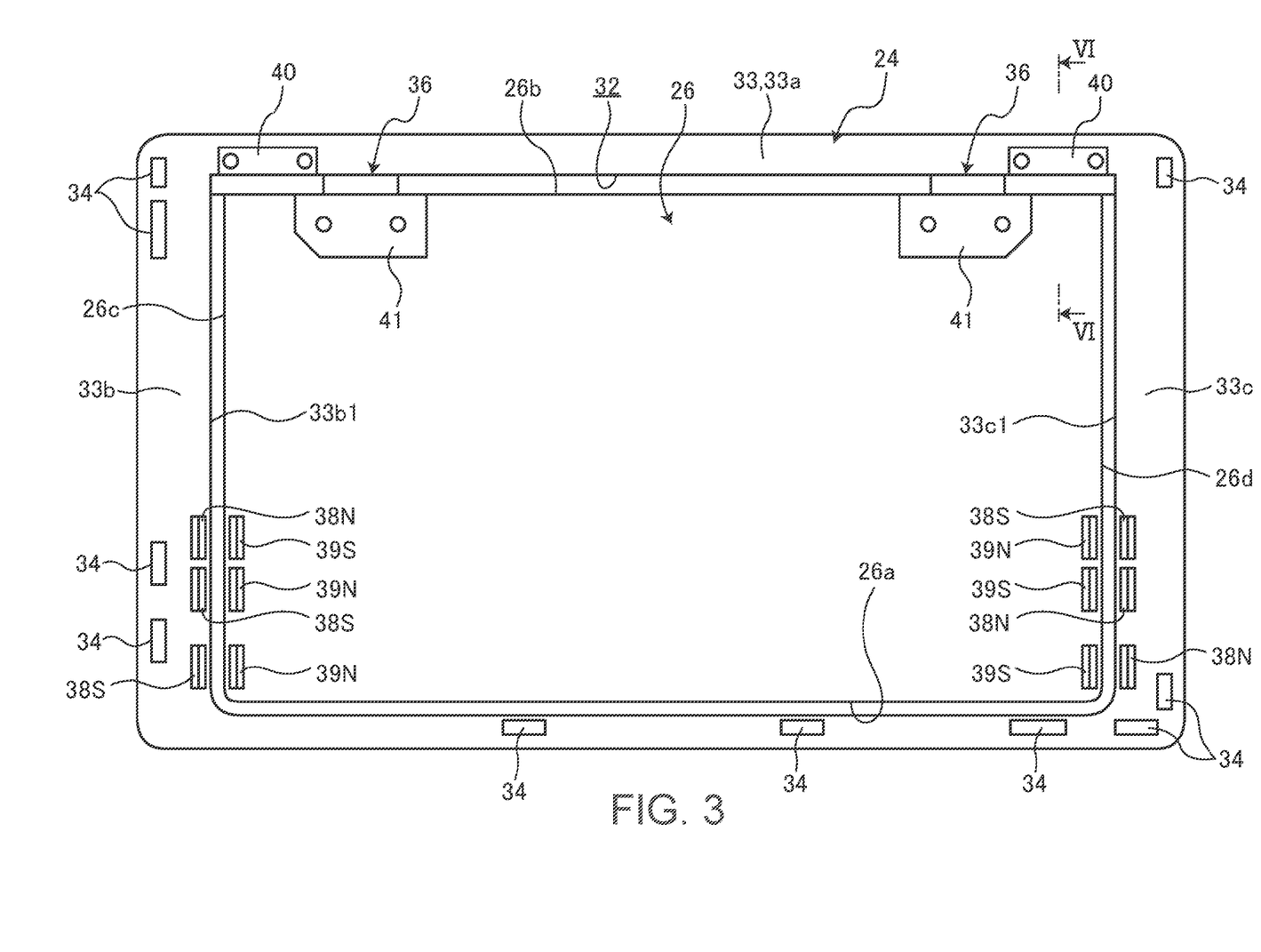
FIG. 3 is a front view illustrating an internal structure of the stand.
Figure 4:
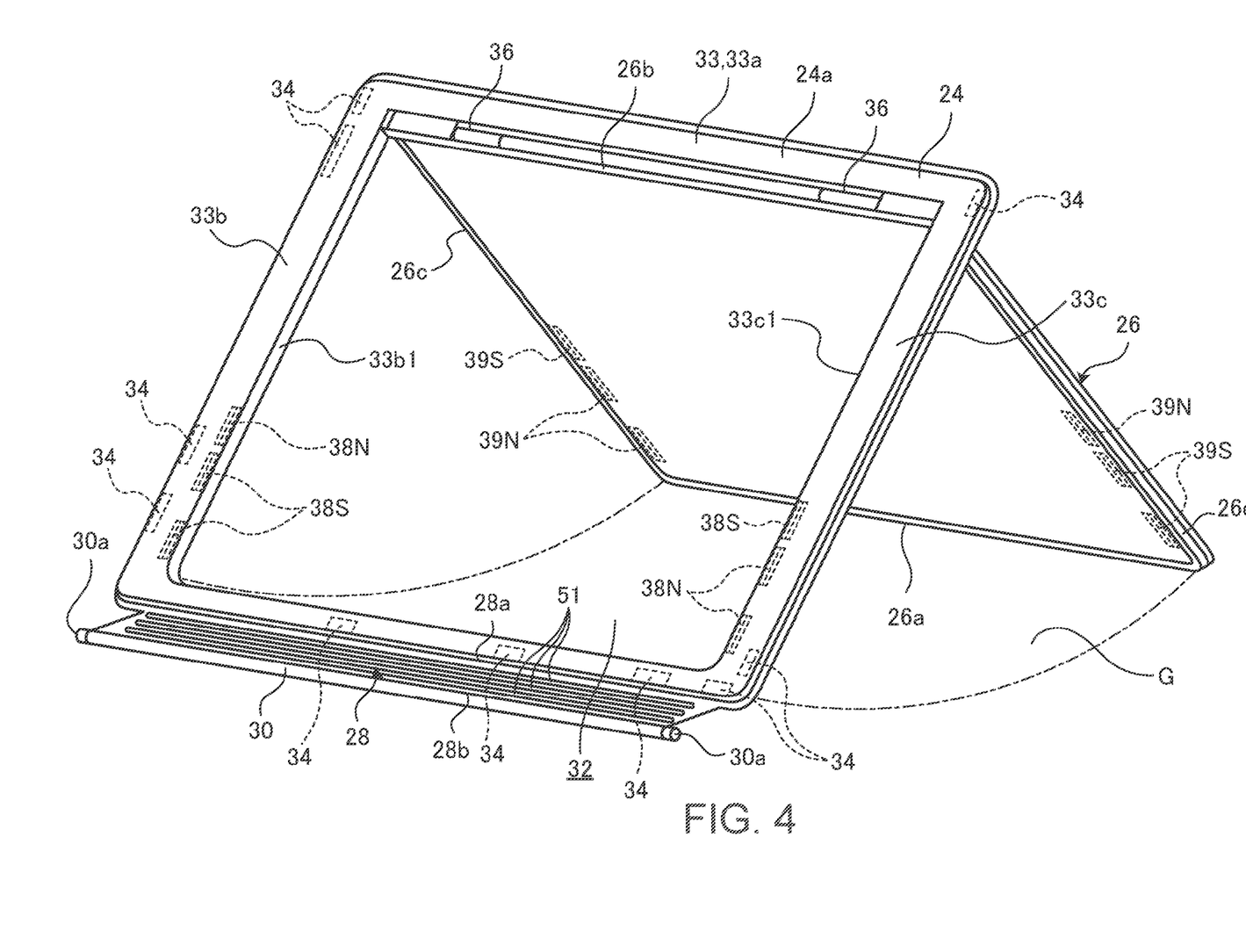
FIG. 4 is a perspective view of the stand in an erect state.
Figure 5:
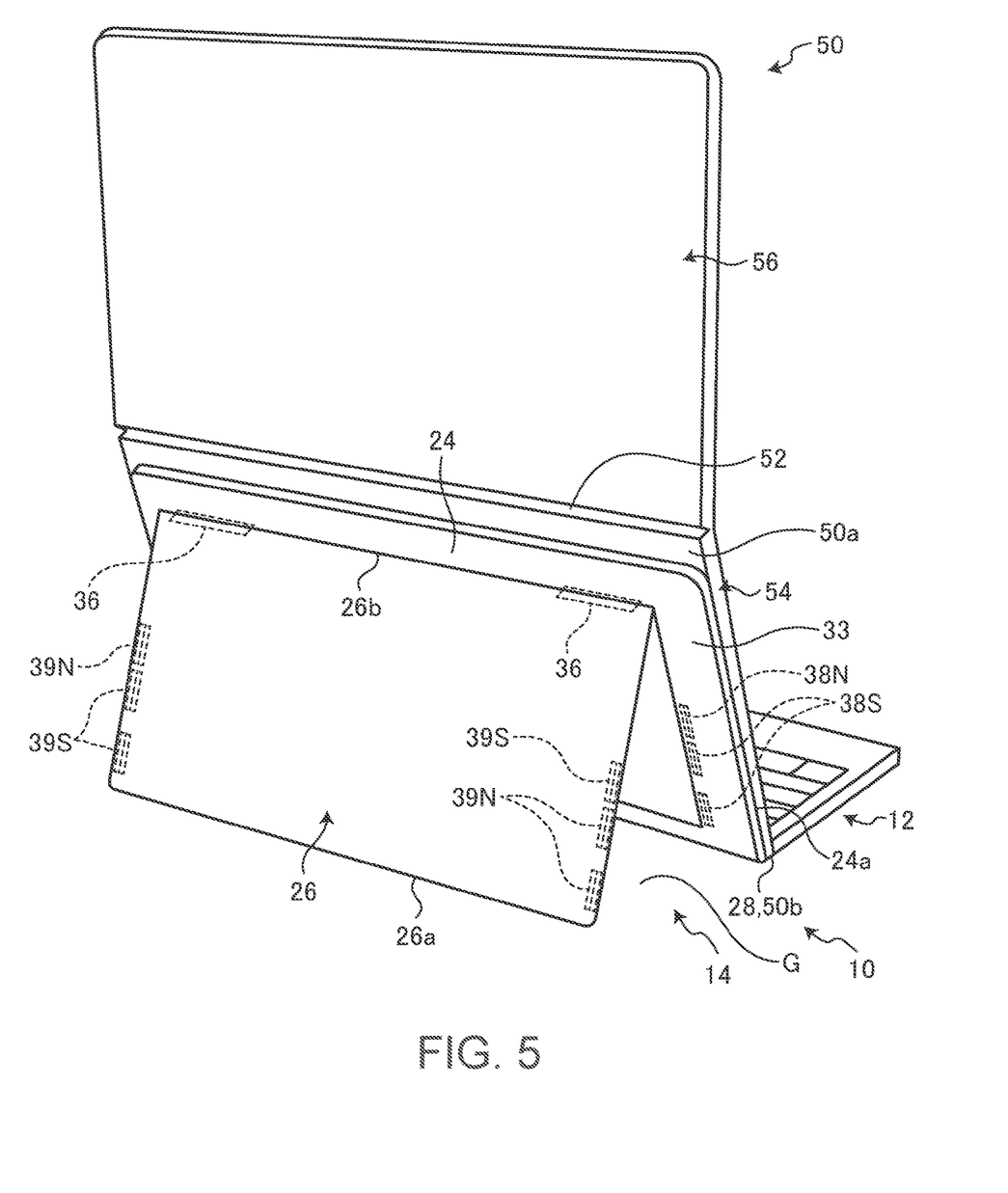
FIG. 5 is a schematic perspective view illustrating a state where an electronic apparatus is placed vertically and stands against the stand.

FIG. 3 is a front view illustrating an internal structure of the stand 14. FIG. 4 is a perspective view of the stand 14 in an erect state. FIG. 5 is a schematic perspective view illustrating a state where an electronic apparatus 50 is placed vertically and stands against the stand 14. The stand 14 supports, for example, the thin electronic apparatus 50 as illustrated in FIG. 5 in an erect state. As illustrated in FIGS. 1 to 4, the stand 14 is provided with a frame body 24, a leg portion 26, and a band portion 28. In addition, FIG. 3 is a diagram in which a surface material formed of, for example, suede and covering the front surface of the stand 14 is removed to expose the internal structure of the stand 14, and the band portion 28 is not illustrated.

The frame body 24 is a thin plate member that has a rectangular frame shape. The frame body 24 has a rectangular opening portion 32 and a supporting portion 33 which has a rectangular frame shape, which is provided around the opening portion 32, and which supports the rear surface 50a of the electronic apparatus 50. The outer peripheral contour of the frame body 24 is substantially the same as the keyboard 12 in plan view. In the supporting portion 33, a plurality of magnets 34 are embedded at dispersed positions. Each magnet 34 faces the supporting surface 24a of the frame body 24. The supporting surface 24a is one surface of the supporting portion 33, and is a surface with which the rear surface 50a of the electronic apparatus 50 is in contact. A magnet is provided on the rear surface 50a of the electronic apparatus 50, and the magnet 34 is provided at a position at which the magnet 34 is able to attract the magnet of the electronic apparatus 50.

The leg portion 26 is a rectangular plate which functions as a kickstand. The leg portion 26 is connected to the supporting portion 33 via a torque hinge 36 inside the opening portion 32 and is relatively rotatable about the supporting portion 33. In the case of the present embodiment, a pair of torque hinges 36 on the left and right sides are provided on one long side frame 33a of the supporting portion 33. The long side frame 33a forms an edge of the frame body 24 on the far side from the band portion 28. The leg portion 26 is rotatable at least between a first angular position and a second angular position.

The first angular position is a position at which the leg portion 26 is accommodated inside the opening portion 32 and the opening portion 32 is closed without an approximate gap (refer to FIGS. 1 and 3). At the first angular position, the stand 14 is configured such that the frame body 24 and the leg portion 26 have a thin plate shape as a whole.

The second angular position is a position at which a tip edge 26a on a side of the leg portion 26 opposite to the torque hinge 36 side is in contact with a placement surface G and the stand 14 is erected (refer to FIG. 4). The second angular position is, for example, a position at which the surface normal direction of the supporting portion 33 and the surface normal direction of the leg portion 26 are approximately 90 degrees (refer to FIG. 3). In addition, the leg portion 26 is connected to the base edge 26b on a side opposite to the tip edge 26a via the torque hinge 36.

The leg portion 26 is able to function as a kickstand even at an angle smaller than the angle at the second angular position, for example, an angle of about 30 degrees illustrated in FIG. 5. The leg portion 26 is able to function as a kickstand at an angle larger than the angle at the second angular position, for example, approximately 120 degrees. The torque hinge 36 generates a predetermined rotary torque in a case where the torque hinge 36 is set at least an angle at which the leg portion 26 functions as a kickstand, for example, 30 degrees or more. Thereby, the leg portion 26 can be kept at any angle with respect to the supporting portion 33. In addition, the stand 14 according to the present embodiment is configured such that the leg portion 26 opens in substantially only one direction with respect to the supporting portion 33. However, the stand 14 may be configured such that the leg portion 26 opens in both directions to be described later. The leg portion 26 may 26 may have a shape other than the rectangular shape.

As illustrated in FIG. 3, the stand 14 has a plurality of first magnets 38N and 38S embedded in the supporting portion 33 and a plurality of second magnets 39N and 39S embedded in the leg portion 26. The magnets 38N, 38S, 39N, and 39S serve as stoppers for attracting each other and keeping the leg portion 26 accommodated (first angular position). In the description of the present embodiment, the first magnet 38N is disposed in a form in which a desired attraction surface of the magnet is the N pole, and the first magnet 38S is disposed in a form in which a desired attraction surface of the magnet is the S pole. In addition, the same applies to second magnets 39N and 39S.

In each of the first magnets 38N and 38S, the surface facing the opening portion 32 is an attraction surface. For example, three first magnets 38N and 38S are arranged side by side along an inside surface 33b1 of a short side frame 33b on one side which intersects one end of the long side frame 33a to which a torque hinge 36 is connected. Further, for example, three first magnets 38N and 38S are arranged side by side along an inside surface 33c1 of the other short side frame 33c which intersects the other end of the long side frame 33a. The first magnets 38N and 38S of the present embodiment are arranged in the order of N pole, S pole, and S pole to face the opening portion 32 on the inside surface 33b1, and are arranged in the order of S pole, N pole, and N pole to face the opening portion 32 on the inside surface 33c1.

In each of the second magnets 39N and 39S, the surface of the supporting portion 33 facing the inside surfaces 33b1 and 33c1 is an attraction surface. For example, three second magnets 39N and 39S are arranged side by side along one outside surface 26c facing the inside surface 33b1 in a case where the leg portion 26 is in the accommodated state.

Further, for example, three second magnets 39N and 39S are arranged side by side along the other outside surface 26d facing the inside surface 33c1 in the accommodated state. The second magnets 39N and 39S respectively face the first magnets 38N and 38S so as to be attractable. Therefore, the second magnets 39N and 39S of the present embodiment are arranged in the order of S pole, N pole, and N pole to face the inside surface 33b1 on the outside surface 26c, and are arranged in the order of N pole, S pole, and S pole to face the inside surface 33c1 on the outside surface 26d. In such a manner, the magnets 38N, 38S, 39N, and 39S are able to generate a higher attraction force by appropriately arranging the N poles and the S poles in an alternating manner. It is apparent that the number of the provided magnets 38N, 38S, 39N, and 39S and the order of arrangement of the magnets 38N, 38S, 39N, and 39S are not limited to the above-described configuration.

Here, a specific configuration example of the torque hinge 36 and an operation thereof will be described by illustrating a relationship between a rotation angle of the leg portion 26 and a stopper action due to the magnets 38N, 38S, 39N, and 39S.

Figure 6A:
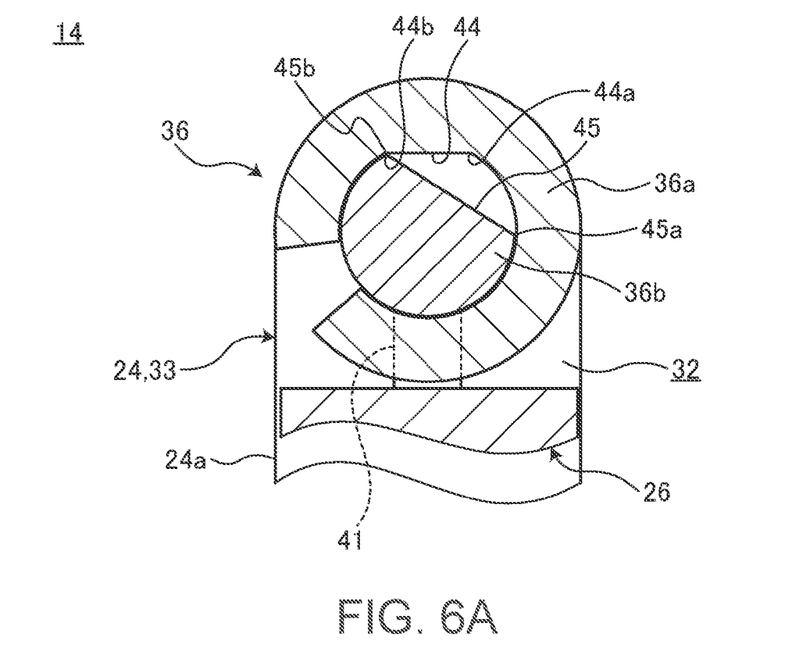
FIG. 6A is a schematic cross-sectional view taken along line VI-VI in FIG. 3.
Figure 6B:
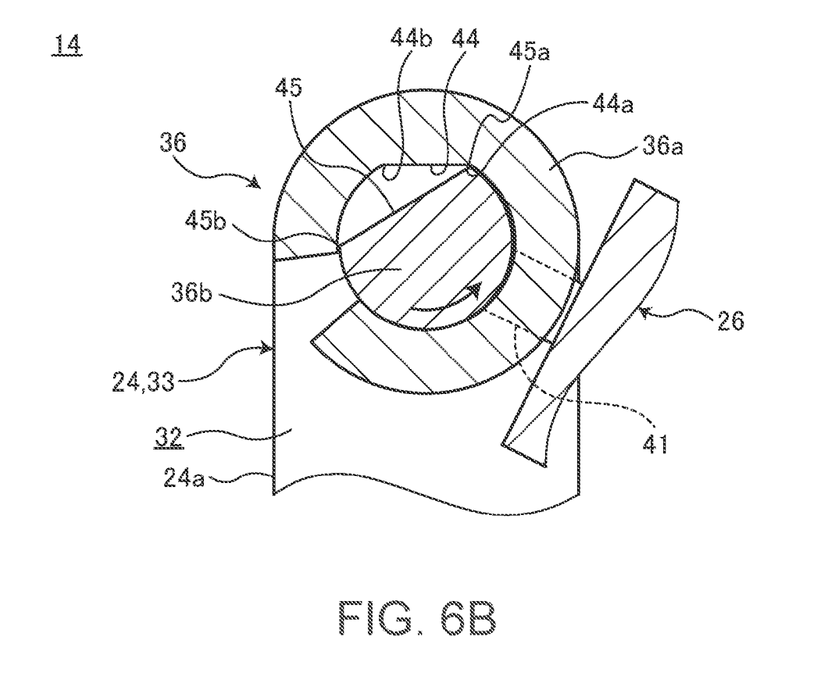
FIG. 6B is a cross-sectional view illustrating a state where a leg portion is rotated in a first direction from a position illustrated in FIG. 6A.
Figure 6C:
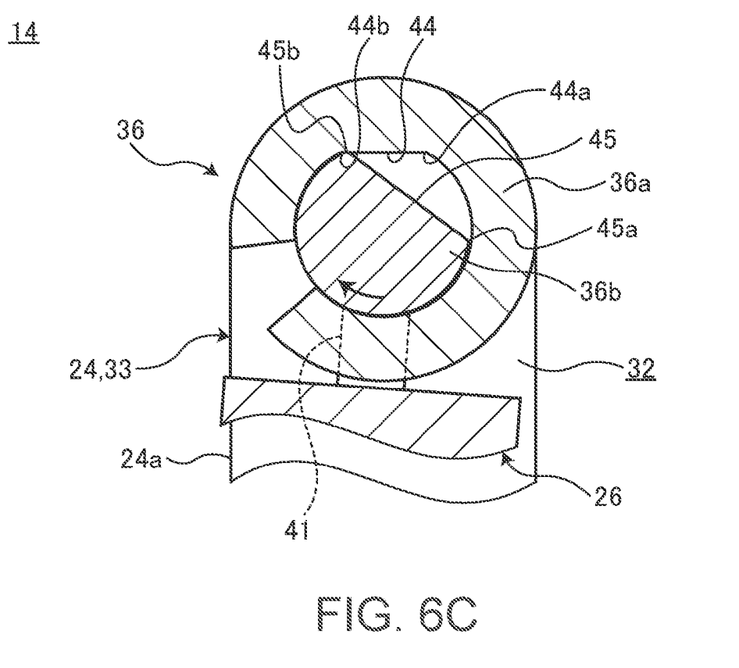
FIG. 6C is a cross-sectional view illustrating a state where the leg portion is rotated in a second direction from the state illustrated in FIG. 6A.

FIG. 6A is a schematic cross-sectional view taken along the line VI-VI of FIG. 3 and illustrates a state where the leg portion 26 is set at the first angular position. FIG. 6B is a cross-sectional view illustrating a state where the leg portion 26 is rotated in a first direction from a position illustrated in FIG. 6A. FIG. 6C is a cross-sectional view illustrating a state where the leg portion 26 is rotated in a second direction from the state illustrated in FIG. 6A.

As illustrated in FIG. 3, the torque hinge 36 is connected to the long side frame 33a by using a bracket 40 for the supporting portion 33, and is connected to a base edge 26b by using a bracket 41 for the leg portion 26. The brackets 40 and 41 are, for example, thin metal plates, and are fixed to the supporting portion 33 and the leg portion 26 by using screws, double-sided tape, a bonding adhesive, or the like.

As illustrated in FIGS. 6A to 6C, the torque hinge 36 has a shaft cylinder portion 36a fixed to the supporting portion 33 via the bracket 40, and a shaft 36b fixed to the leg portion 26 via the bracket 41. A shaft cylinder portion 36a and a shaft 36b are disposed such that the axial direction thereof is set along the longitudinal direction of the long side frame 33a and the base edge 26b. The shaft cylinder portion 36a is formed, for example, by forming a metal sheet in a C-shape or a cylindrical shape and forming a hollow portion into which the shaft 36b is inserted. A flat surface portion 44, which protrudes toward the hollow portion, is formed in a part of the inner peripheral surface of the shaft cylinder portion 36a. The shaft 36b is, for example, a metal shaft having a columnar shape, and has an outer diameter by which the shaft 36b can be slidably inserted into the hollow portion of the shaft cylinder portion 36a. A flat surface portion 45 having a notch shape is formed on a part of the outer peripheral surface of the shaft 36b.

The torque hinge 36 generates a rotary torque due to a sliding resistance between the inner peripheral surface of the shaft cylinder portion 36a and the outer peripheral surface of the shaft 36b and a sliding resistance between the flat surface portions 44 and 45. At a position at which the flat surface portions 44 and 45 do not slide with each other, the torque hinge 36 appropriately changes in accordance with an angle by controlling the rotary torque due to the sliding resistance caused by the fitting design, shape design, and the like of both the inner peripheral surface of the shaft cylinder portion 36a and the outer peripheral surface of the shaft 36b. On the other hand, in the torque hinge 36, at the position at which the flat surface portions 44 and 45 slide with each other, a large sliding resistance occurs due to friction between the flat surfaces, and the rotary torque rapidly increases.

At the first angular position illustrated in FIG. 6A, the shaft 36b is positioned such that the flat surface portion 45 is not in contact with the flat surface portion 44 of the shaft cylinder portion 36a. For example, at the first angular position, the flat surface portion 45 is positioned such that one first end portion 45a is far away from one first end portion 44a of the flat surface portion 44, and is positioned such that the other second end portion 45b is close to the other second end portion 44b of the flat surface portion 44. At the first angular position, the sliding resistance between the inner peripheral surface of the shaft cylinder portion 36a and the outer peripheral surface of the shaft 36b is designed to be minimized, preferably to be substantially zero. Therefore, the leg portion 26 is kept at the first angular position only by the attraction force of the magnets 38N, 38S, 39N, and 39S.

In a case where the leg portion 26 at the first angular position illustrated in FIG. 6A is used as the kickstand, the leg portion 26 is pressed with a fingertip or the like toward the first direction (direction in which the supporting surface 24a protrudes from the rear surface). At the first angular position, the leg portion 26 is kept only by the attraction force of the magnets 38N, 38S, 39N, and 39S, and thus a user is able to easily start the rotation of the leg portion 26.

The torque hinge 36 is preferably kept in a state where the rotary torque is minimized up to a predetermined position (for example, approximately 10 degrees) where the leg portion 26 is between the first angular position and the second angular position. Then, the user is able to easily start the rotation of the leg portion 26 in the first direction. Further, in a case where the rotary torque is at the minimum between the first angular position and the predetermined angle, for example, in a state where the leg portion 26 is accommodated by being returned from the second angular position to the first angular position, the operability is improved. That is, in a case where the leg portion 26 is rotated from the second angular position to the second direction opposite to the first direction and passes through the predetermined angle, the rotary torque is minimized. Therefore, the leg portion 26 is a substantially free. As a result, the leg portion 26 is easily and reliably returned to the first angular position by the attraction force of the magnets 38N, 38S, 39N, and 39S, and is kept as it is.

On the other hand, the torque hinge 36 may be configured such that a certain large rotary torque is generated at the first angular position. In such a case, the rotary torque exceeds the attraction force of the magnets 38N, 38S, 39N, and 39S. Thus, it is also conceivable that the leg portion 26 is unlikely to be completely returned to the first angular position. It is apparent that the torque hinge 36 may be configured such that a certain rotary torque is generated even at the first angular position, depending on the magnitude of the rotary torque generated by the torque hinge 36, the magnitude of the attraction force of the magnets 38N, 38S, 39N, and 39S, and the like.

In a case where the leg portion 26 is further rotated in the first direction after passing the predetermined angle described above, the sliding resistance due to a fitting design or the like between the inner peripheral surface of the shaft cylinder portion 36a and the outer peripheral surface of the shaft 36b gradually increases. For example, at the position of about 30 degrees illustrated in FIG. 5, the torque hinge 36 generates a sufficient rotary torque. Therefore, the leg portion 26 can be stably used as the kickstand.

In a case where the leg portion 26 is further rotated in the first direction and reaches the angle illustrated in FIG. 6B (for example, approximately 60 degrees), the first end portions 44a and 45a come into contact with each other and the flat surface portions 44 and 45 start to slide with each other. Then, the rotary torque of the torque hinge 36 rapidly increases. Therefore, for example, at the second angular position (approximately 90 degrees) illustrated in FIG. 4, the leg portion 26 is able to be stably kept by the large rotary torque even though the stand 14 is at a large lean angle. As a result, it is possible to prevent the stand 14 from being crushed or rattling.

Next, for example, a case where a user erroneously presses the leg portion 26, which is at the first angular position, toward the second direction opposite to the first direction may be considered. In such a case, as illustrated in FIGS. 6A and 6C, immediately after the leg portion 26 is rotated from the first angular position to the second direction, the second end portions 44b and 45b come into contact with each other. Then, the flat surface portions 44 and 45 start to slide with each other. Therefore, the rotary torque of the torque hinge 36 is rapidly increased immediately after the start of rotation. As a result, the user is able to immediately notice that the rotation direction is wrong.

Figure 7:
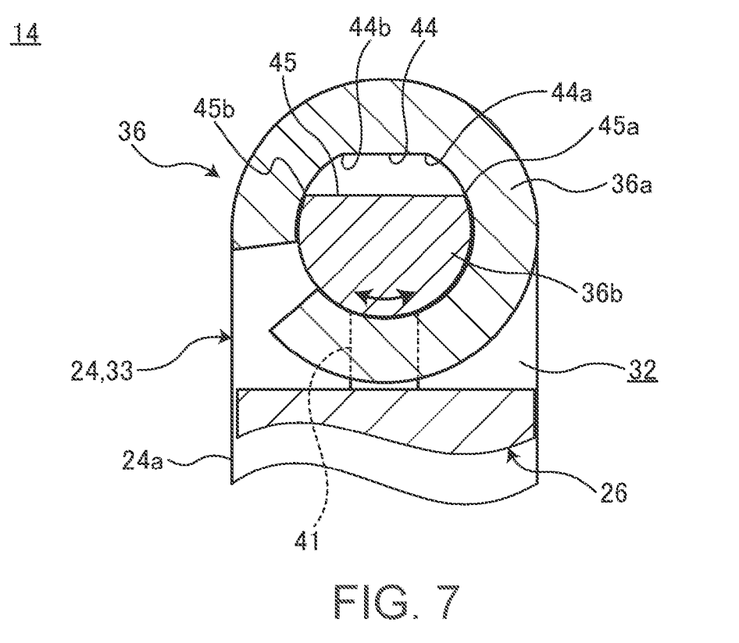
FIG. 7 is a schematic cross-sectional view of a torque hinge and a peripheral portion thereof illustrating a modification example in which the leg portion can be opened in both directions.

As illustrated in FIG. 7, the torque hinge 36 may be designed such that not only the first end portions 44a and 45a of the flat surface portions 44 and 45 but also the second end portions 44b and 45b are separated from each other by a certain distance at the first angular position. Then, the torque hinge 36 has a structure that substantially allows the torque hinge 36 to rotate in both the first direction and the second direction. As a result, the stand 14 is able to be rect by opening the leg portion 26 in a desired rotation direction, regardless of the front and rear surfaces.

Returning to FIGS. 1 and 2, the band portion 28 is connected to the long side frame 33d along an edge of a long side frame 33d on a side opposite to the long side frame 33a.

The band portion 28 has a total length which is slightly shorter than the total length of the long side frame 33d, and has a width which is capable of supporting the side surface 50b of the electronic apparatus 50 (refer to FIG. 5). One surface of the band portion 28 is provided with a plurality of anti-slip members 51 (refer to FIG. 4) along the elongated direction. The anti-slip member 51 is, for example, a rubber. The band portion 28 is formed by laminating two surface materials. The surface materials thereof are fabric materials such as suedes, felts, or leathers, and each has some elasticity in the thickness direction. Thereby, the band portion 28 has flexibility and is thus pliable. In the present embodiment, the front surfaces of the frame body 24 and the leg portion 26 are also covered with the same surface material as the band portion 28. In the in-use state posture of the stand 14 illustrated in FIGS. 4 and 5, the flexible band portion 28 is bent from the long side frame 33d and placed on the placement surface G in a state where the frame body 24 is kept at an appropriate angle.

The bar 30 is provided along a tip edge 28b that is opposite to a connection edge 28a of the frame body 24 in the band portion 28. The bar 30 is a material that attracts the magnet, and is a cylindrical rod of an iron material (including an alloy such as a stainless steel material) in the present embodiment. The bar 30 is slightly longer than the band portion 28, and portions protruding from the band portion 28 are covered with caps 30a. The bar 30 is a part to be inserted into the recessed portion 16, and has a thickness and a length by which the bar 30 can be inserted into the recessed portion 16. The lengths of the recessed portion 16 and the bar 30 are substantially the same, and the bar 30 is not displaced in the elongated direction inside the recessed portion 16. In addition, the surface material, which forms the band portion 28, is continuous so as to cover not only the band portion 28 but also the frame body 24 and the bar 30. The band portion 28 may not have the bar 30 and the tip edge 28b may be connected to the keyboard 12 in a non-detachable manner.

In the keyboard-stand set 10, in a case where the stand 14 is mounted on the keyboard 12, as illustrated in FIG. 2, in a case where the bar 30 is inserted into the recessed portion 16, the bar 30 is attracted and fixed by the magnet 18. Thereby, the keyboard 12 and the stand 14 are combined. On the other hand, in a case where the stand 14 is pulled from the keyboard 12, the bar 30 comes out of the recessed portion 16 against the attraction force of the magnet 18. Thereby, the stand 14 is removed from the keyboard 12.

As an example of the electronic apparatus 50 supported by the stand 14 according to the present embodiment, a so-called foldable PC can be exemplified as illustrated in FIG. 5. It is apparent that the stand 14 and the keyboard-stand set 10 are also applicable to other thin electronic apparatuses such as a tablet PC and a smartphone.

The electronic apparatus 50 is a foldable PC, and includes a first chassis 54 and a second chassis 56 which are connected via a central hinge portion 52. On the rear side of the rear surface 50a of the electronic apparatus 50, a foldable display over substantially the entire surface from the first chassis 54 to the second chassis 56 is provided. The display thereof is, for example, a touch panel type organic EL. The electronic apparatus 50 can be input through a software keyboard displayed on the display, and may be input from the keyboard 12. In a case where the first chassis 54 and the second chassis 56 are folded at the hinge portion 52, the display is also folded.

As illustrated in FIG. 5, the keyboard-stand set 10 is able to keep the electronic apparatus 50 in a state of being vertically erect. The first chassis 54 is provided with an attracting member such as a magnet or an iron material at a position corresponding to the magnet 34 of the frame body 24. In such a case, the frame body 24 of the stand 14 supports only the first chassis 54, the second chassis 56 protrudes from the stand 14, and the position of the barycenter thereof is slightly high. However, the stand 14 attracts the first chassis 54 due to magnetic force, and thus the electronic apparatus 50 is stabilized. It is apparent that the keyboard-stand set 10 is able to also keep the electronic apparatus 50 in a state where the electronic apparatus 50 is erected horizontally. In such a case, although there is no attraction due to the magnetic force between the stand 14 and the first chassis 54, the electronic apparatus 50 is stable since the position of the barycenter is low in a state where the chassis 54 and 56 are aligned on the left and right.

The electronic apparatus 50 has the side surface 50b which is in contact with the band portion 28 and is stabilized without slipping due to the action of the anti-slip member 51. Further, the lower end portion of the electronic apparatus 50 is in contact with the rear side surface of the keyboard 12, and thus the lower end portion is not displaced forward. Since the leg portion 26 is able to be kept at an optional angle due to the action of the torque hinge 36, the tilt angle of the frame body 24 can be adjusted for easy viewing of the display 58.

Since the keyboard 12 is a wireless type keyboard, a wired connection with the electronic apparatus 50 is unnecessary. Therefore, even in a case where the keyboard 12 is removed from the stand 14 and placed at a place some distance away, operations such as keyboard input are possible.

As described above, the stand 14 of the present embodiment includes the first magnets 38N and 38S that are provided on the inside surfaces 33b1 and 33c1 of the supporting portion 33 to face the opening portion 32, and the second magnets 39N and 39S that are provided on the outside surfaces 26c and 26d of the leg portion 26 facing the inside surfaces 33b1 and 33c1 so as to be capable of attracting the first magnets 38N and 38S.

Therefore, in the stand 14, in the accommodated state where the leg portion 26 is accommodated in the opening portion 32, the leg portion 26 is kept by the magnets 38N, 38S, 39N, and 39S with respect to the supporting portion 33. As a result, the entire stand 14 can be made smaller and thinner by adopting a configuration in which the leg portion 26 has a thin plate shape in a case of carrying or the like in a state where the leg portion 26 is not used as the kickstand. Moreover, the stand 14 uses the magnet 38N or the like as a stopper for keeping the leg portion 26 in the accommodated state, and does not require a physical stopper member. Therefore, it is possible to achieve reduction in thickness of the leg portion 26 and the supporting portion 33. Further, the leg portion 26 is configured to be kept by the attraction force of the magnet 38N or the like instead of the physical stopper. With such a configuration, the stopper may not be damaged in a case of rotating in the opposite direction. In other words, the stand 14 may be configured such that the leg portion 26 is rotatable in two directions (refer to FIG. 7).

In the configuration exemplified in the above description, the second magnets 39N and 39S are provided on the left and right outside surfaces 26c and 26d of the leg portion 26, and the first magnets 38N and 38S are provided on the left and right inside surfaces 33b1 and 33c1 of the supporting portion 33 facing the second magnets 39N and 39S. However, the magnets 38N, 38S, 39N, and 39S may be provided on only one of the left and right inside surfaces 33b1 and 33c1 and the left and right outside surfaces 26c and 26d. Further, the magnets 38N, 38S, 39N, and 39S may be provided on the long side frame 33d and the tip edge 26a opposite to the torque hinge 36 side. However, the attraction force of the magnet tends to be lower than that of the physical stopper. Therefore, considering the stability of the leg portion 26 in the accommodated state, it is preferable that the magnet is provided on each of both the left and right inside surfaces 33b1 and 33c1 and the left and right outside surfaces 26c and 26d.

The present invention is not limited to the above-described embodiment, and there is no doubt that the present invention can be freely changed without departing from the gist of the present invention.

In the configuration exemplified in the above description, the stand 14 is connected to the keyboard 12. However, the stand 14 may be used as a single stand that is not connected to the keyboard 12. In such a case, in the stand 14, for example, the bar 30 may be used by being attracted to magnets mounted on the chassis 54 and 56 of the electronic apparatus 50.

The invention claimed is:

1. A stand that supports an electronic apparatus in an erect state, the stand comprising:
   a frame body having an opening portion and a supporting portion which is around the opening portion and which supports a rear surface of the electronic apparatus;
   a leg portion that is rotatably connected to the supporting portion inside the opening portion via a torque hinge and that is configured to move between a first angular position, at which the leg portion is inside the opening portion, and a second angular position, at which the leg portion protrudes from the supporting portion by rotating in a first direction from the first angular position;
   a first magnet on a first inside surface of the supporting portion and faces the opening portion; and
   a second magnet on a first outside surface of the leg portion and faces the first inside surface of the supporting portion and that is configured for attraction to the first magnet.

2. The stand according to claim 1,
   wherein the frame body and the leg portion are each configured in a rectangular shape,
   the torque hinge connects the first inside surface of the supporting portion along one edge of the opening portion and the first outside surface of the leg portion which faces the inside surface,
   a respective first magnet is on each of a second inside surface of the supporting portion, which intersects one end of the first inside surface, and of a third inside surface of the supporting portion, which intersects the other end of the first inside surface, and
   a respective second magnet is on each of a second outside surface of the leg portion, which faces the second inside surface, and a third outside surface of the leg portion, which faces the third inside surface.

3. The stand according to claim 1,
   wherein a rotary torque of the torque hinge is configured to change in accordance with a rotation angle of the leg portion, and
   the torque hinge is configured with a minimum rotary torque when the leg portion is at least at the first angular position.

4. The stand according to claim 3,
   wherein the torque hinge is configured to maintain the minimum rotary torque while the leg portion is rotated from the first angular position to a predetermined angle toward the first direction.

5. The stand according to claim 4,
   wherein the rotary torque of the torque hinge is configured to increase by an angle which is smaller than the predetermined angle from the first angular position when the leg portion is rotated from the first angular position toward a second direction opposite to the first direction.

6. The stand according to claim 1,
   in the first magnet, an N pole and an S pole are side by side on the first inside surface, and
   in the second magnet, an N pole and an S pole are side by side on the first outside surface, the N pole of the second magnet faces the S pole of the first magnet, and the S pole of the second magnet faces the N pole of the first magnet.

7. A keyboard-stand set comprising:
   a keyboard for wirelessly inputting to an electronic apparatus; and
   a stand that supports the electronic apparatus in an erect state,
   wherein the stand includes:
      a frame body having an opening portion and a supporting portion which is around the opening portion and which supports a rear surface of the electronic apparatus,
      a leg portion that is rotatably connected to the supporting portion inside the opening portion via a torque hinge and that is configured to move between a first angular position, at which the leg portion is inside the opening portion, and a second angular position, at which the leg portion protrudes from the supporting portion by rotating in a first direction from the first angular position, a first magnet on a first inside surface of the supporting portion and faces the opening portion, a second magnet on a first outside surface of the leg portion and faces the first inside surface of the supporting portion and that is configured for attraction to the first magnet, and a band portion along one edge of the supporting portion, and that has a width capable of supporting a side surface of the electronic apparatus, and that rotatably connects the stand and one edge of the keyboard.

* * * * *